US007769796B2

(12) United States Patent
Hsiao

(10) Patent No.: US 7,769,796 B2
(45) Date of Patent: Aug. 3, 2010

(54) METHOD FOR LOOKING UP A TABLE FOR DATA TRANSFERRING AND LOOK-UP TABLE THEREWITH

(75) Inventor: Chih-Hsiang Hsiao, Sijhih (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 1448 days.

(21) Appl. No.: 11/155,733

(22) Filed: Jun. 16, 2005

(65) Prior Publication Data

US 2006/0288060 A1 Dec. 21, 2006

(51) Int. Cl.
*G06F 7/38* (2006.01)

(52) U.S. Cl. ....................... 708/235; 708/200; 708/230; 708/270; 708/272

(58) Field of Classification Search ....................... None
See application file for complete search history.

(56) References Cited

U.S. PATENT DOCUMENTS 6,223,192 B1 * 4/2001 Oberman et al. ............ 708/270

* cited by examiner

*Primary Examiner*—Lewis A Bullock, Jr.
*Assistant Examiner*—Michael Yaary
(74) *Attorney, Agent, or Firm*—Winston Hsu

(57) ABSTRACT

A look-up table which is required during looking up table for data transferring and a method for looking up table are provided. The method reduces the size of the look-up table used in the method for looking up table by simplifying the calculations. A reasonable error range is obtained for the required look-up table by adjusting appropriate modifiers. The method can be applied in the method for looking up table similar to the $$Q(x) = x^{\frac{B}{A}}$$

calculation in the digital signal coder/decoder (CODEC), where both A and B are integers, and the calculation is more efficient if B/A is close to 1 or smaller than 1.

19 Claims, 5 Drawing Sheets

METHOD FOR LOOKING UP A TABLE FOR DATA TRANSFERRING AND LOOK-UP TABLE THEREWITH

BACKGROUND OF THE INVENTION

1. Field of the Invention

The present invention relates to a method for looking up table for data transferring in the circuit, and more particularly, to a look-up table that is required during looking up table for data transferring and a method for looking up table thereof.

2. Description of the Related Art

For obtaining a higher precision, it is common that a very complicated and time consuming calculation is required for both the look-up table during looking up table for data transferring in the digital circuit and the method for looking up table thereof. In order to accomplish such complicated and time consuming calculation, it is required to use a hardware of very high cost or a grate amount of the system resources. In addition to the precision requirement, efficiency with reasonable cost is also required, thus it is inadequate in the physical circuit design. Therefore, the complicated and time consuming calculation may be replaced with the method for looking up table. In such case, if the variant range extended, a larger size of the look-up table is required. For the application which has memory limitation or has higher workload for accessing the memory, if the size of the look-up table used in the method for looking up table is too big, it causes more trouble. An example of this is the quantization and de-quantization processes in the digital signal coder/decoder (CODEC).

In the decoder configuration of "An Optimized Software Solution for an ARM Powered™ MP3 Decoder" proposed by ARM (Advanced RISC Machines) Inc., an improved method of de-quantization in the decoder of the digital music format MP3 is provided. However, it cannot eliminate the high error problem.

SUMMARY OF THE INVENTION

Therefore, it is an object of the present invention to provide a look-up table that is required during looking up table for data transferring. The size of the look-up table used in the method for looking up table is reduced by simplifying the calculations.

It is another object of the present invention to provide a look-up table that is required during looking up table for data transferring. A reasonable error range is obtained by properly adjusting the modifiers.

The present invention provides a method for looking up table for data transferring in the circuit. In such method, a main table function having a main table is created first, the size of the main table is determined by a predetermined value, and obtains the result of the main table function by querying the main table. In addition, a fixed table function having a fixed table is further created, and the fixed table function is determined by the quantity of the modifiers. Here, the size of the fixed table is determined by the size of the main table and the predetermined value. In addition, a rest table function having a rest table is further created. The size of the rest table is determined by the operation range of the data transferring, the size of the main table, and the predetermined value. In such data transferring, the result of the data transferring is obtained by selecting a function among the main table function, the fixed table function, and the rest table function, and performing a process of looking up table on one of the main table, the fixed table, and the rest table corresponding to the selected function based on the size of data to be transferred.

In the method for looking up table mentioned above, when the data transferring is $Q(x)=x^{B/A}$, where $0 \leqq x < X_{max}$, Q(x) is the result of the data transferring, x is an input value, A and B are integers, $X_{max}$ is the maximum value of the data transferring, the setup value is $d=2^{N \cdot A}$, where d is a setup value, N is an integer, and $$N \leq \frac{1}{A}\log_2 X_{\max},$$

that is $d \leqq X_{max}$.

In the method for looking up table mentioned above, the size of the main table is $$C_{main} = 2^{INT\left[\log_2\left(\frac{X_{\max}}{d}\right)\right]},$$

and INT(a) represents obtaining integer for a, if the size x of the data to be transferred is in the range of $0 \leqq x < C_{main}$, the main table function $Tab_{main}(x)$ is selected for generating the result of the data transferring.

In the method for looking up table mentioned above, the size of the fixed table for the $M^{th}$ modifier is $C_{fixed,M}=[C_{main}-(C_{main}/d)]$, and the total size of all fixed tables is $C_{all\_}^{fixed}=M \cdot C_{fixed,M}$, and the size x of the data to be transferred is in the range of $C_{main} \leqq x < C_{main} \cdot d$.

In the method for looking up table mentioned above, the size of the rest table is $C_{rest}=X_{max}-C_{main} \cdot d$, the size x of the data to be transferred is in the range of $C_{main} \cdot d \leqq x < X_{max}$, and the rest table is created based on the size of the rest table, such that the rest table function obtains the values corresponding to the size x of the data to be transferred in the range of $C_{main} \cdot d \leqq x < X_{max}$.

In the method for looking up table mentioned above, the result of the data transferring is obtained by performing the main table function, the fixed table function, and the rest table function on the main table, the fixed table, and the rest table respectively based on the condition that the size x of the data to be transferred is in the range of $0 \leqq x < C_{main}$, $C_{main} \leqq x < C_{main} \cdot d$, or $C_{main} \cdot d \leqq x < X_{max}$.

In another embodiment of the present invention, the present invention provides a method for looking up table for data transferring in the circuit. In the method, a main table function having a main table is created, the size of the main table is determined by a predetermined value, and obtains the result of the main table function by querying the main table. In addition, a fixed table function having a fixed table is further created, and the fixed table function is determined by the quantity of the modifiers and the main table. Here, the size of the fixed table is determined by the size of the main table and the predetermined value. In addition, a rest table function having a rest table is further created. The size of the rest table is determined by the operation range of the data transferring, the size of the main table, and the predetermined value. In such data transferring, the result of the data transferring is obtained by selecting a function among the main table function, the fixed table function, and the rest table function, and performing a process of looking up table on one of the main table, the fixed table, and the rest table corresponding to the selected function based on the size of data to be transferred.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

The present invention provides a look-up table required during the quantization and de-quantization processes in a digital signal coder/decoder (CODEC) and a method for looking up table thereof. The method reduces the size of the look-up table used in the method for looking up table by simplifying the calculations. A reasonable error range is obtained for the required look-up table by adjusting appropriate modifiers. In an embodiment of the present invention, the method is applied in the method for looking up table similar to the $$Q(x)=x^{\frac{B}{A}}$$

calculation in the digital signal coder/decoder (CODEC) suitable for the present invention, and the calculation is more efficient if B/A is close to 1 or smaller than 1.

For example, if the look-up table and the method for looking up table thereof mentioned above are applied on an audio-type CODEC, it is suitable for the quantization and de-quantization algorithms performed in the decoder supporting the digital music format MP3 and in the decoder supporting the AAC (Advanced Audio Coding) format.

The method for looking up table provided by the present invention is characterized in that the size of the look-up table is reduced by commonly sharing the look-up table with simplifying calculations in the look-up tables of different ranges. In addition, in order to sustain good precision, some modifiers may be appropriately further added. Moreover, even in some specific condition, the looking up table with the modifiers may be eliminated.

Figure 1:
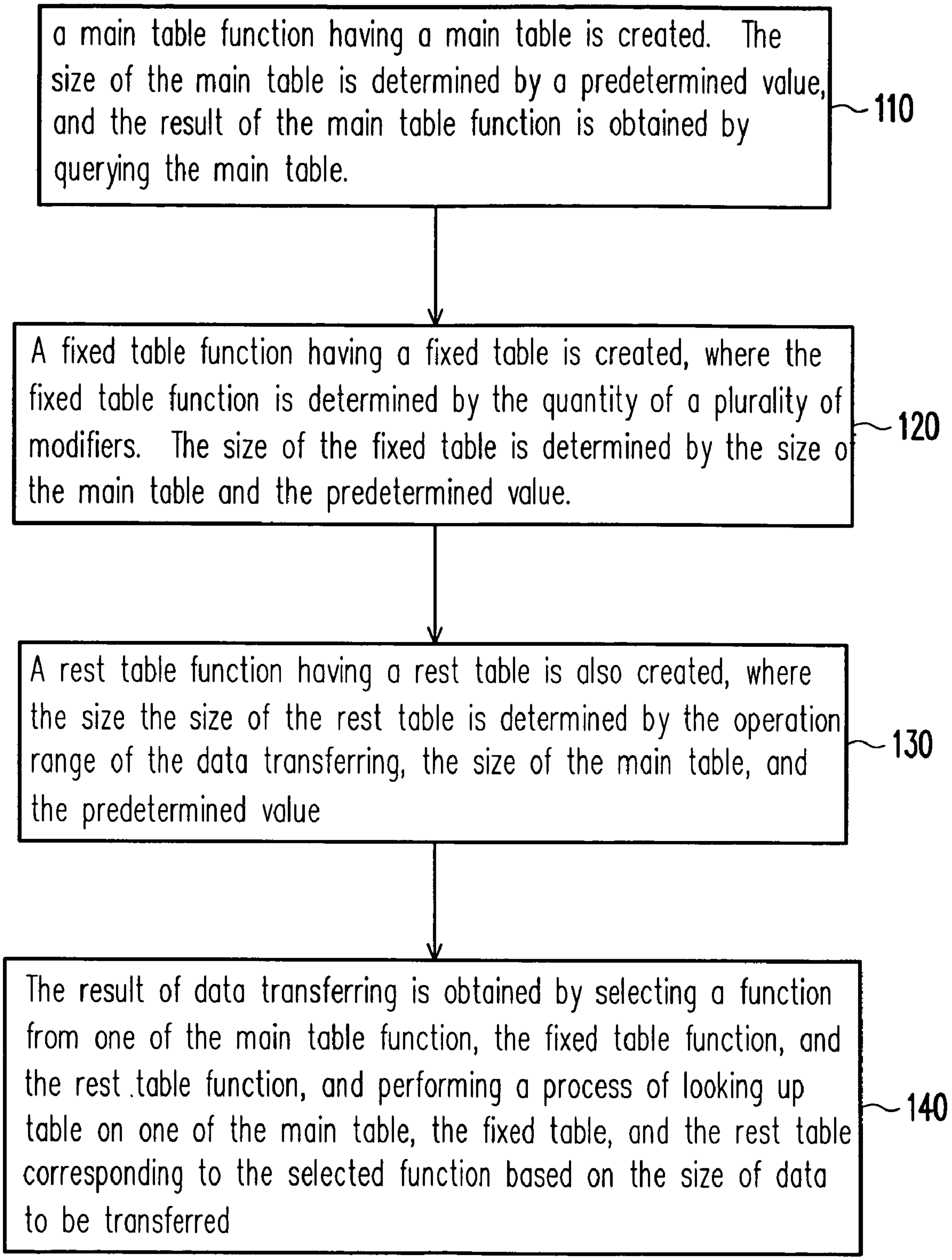
FIGS. 1-4 schematically shows a method for looking up table for data transferring in a circuit of prefer embodiments of the present invention.

In one embodiment, as shown in FIG. 1, the present invention provides a method for looking up table for data transferring in a circuit. In the embodiment, as shown in Step 110, a main table function having a main table is created. The size of the main table is determined by a predetermined value, and the result of the main table function is obtained by querying the main table. As shown in Step 120, a fixed table function having a fixed table is created, where the fixed table function is determined by the quantity of a plurality of modifiers. The size of the fixed table is determined by the size of the main table and the predetermined value. As shown in Step 130, a rest table function having a rest table is also created, where the size of the rest table is determined by the operation range of the data transferring, the size of the main table, and the predetermined value. As shown in Step 140, the result of data transferring is obtained by selecting a function from one of the main table function, the fixed table function, and the rest table function, and performing a process of looking up table on one of the main table, the fixed table, and the rest table corresponding to the selected function based on the size of data to be transferred.

Figure 2:
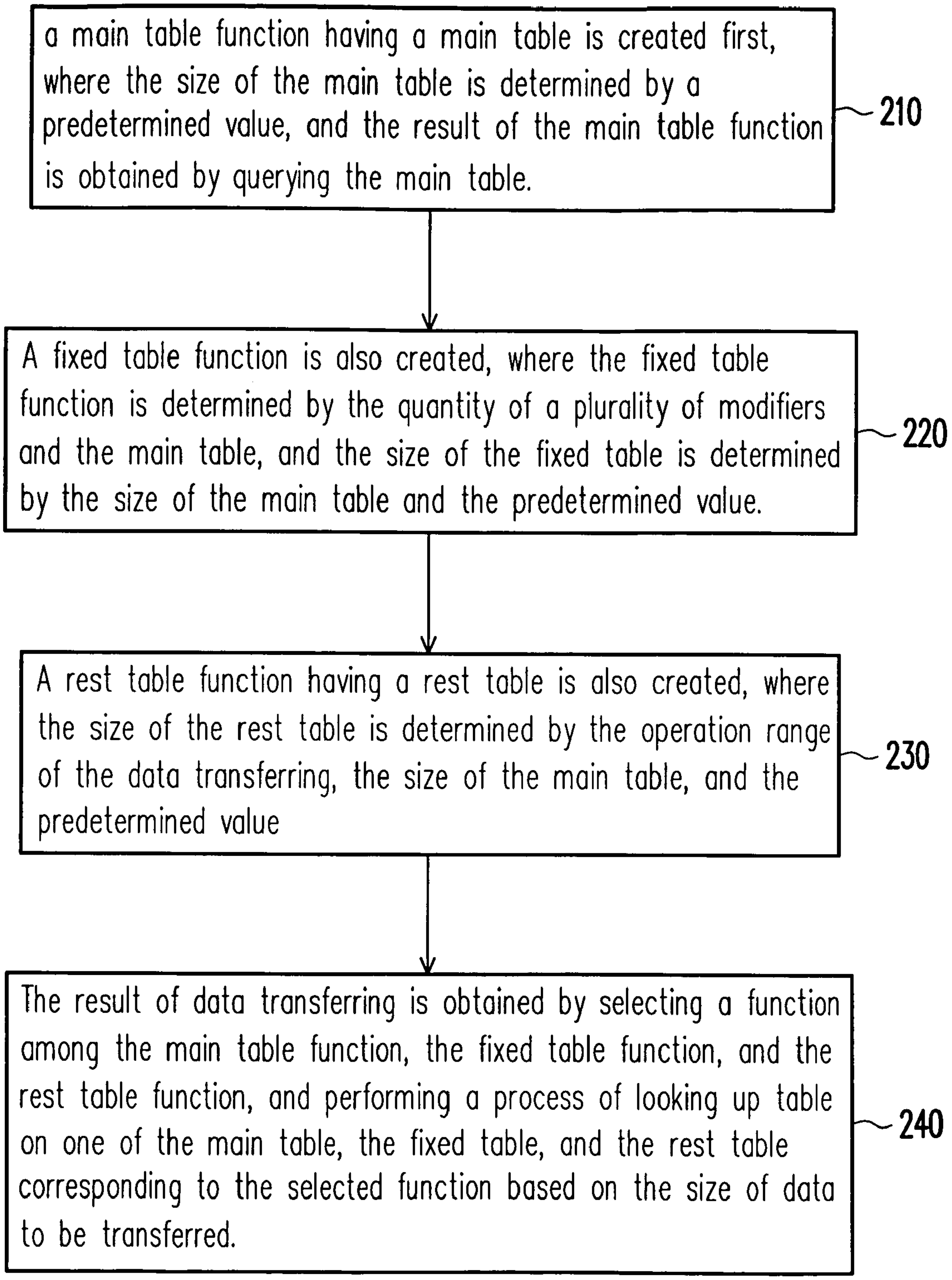

In a further embodiment, as shown in FIG. 2, the present invention provides a method for looking up table for data transferring in a circuit. In the embodiment, a main table function having a main table is created first, as shown in Step 210, where the size of the main table is determined by a predetermined value, and the result of the main table function is obtained by querying the main table. As shown in Step 220, a fixed table function is also created, where the fixed table function is determined by the quantity of a plurality of modifiers and the main table, and the size of the fixed table is determined by the size of the main table and the predetermined value. As shown in Step 230, a rest table function having a rest table is also created, where the size of the rest table is determined by the operation range of the data transferring, the size of the main table, and the predetermined value. As shown in Step 240, the result of data transferring is obtained by selecting a function among the main table function, the fixed table function, and the rest table function, and performing a process of looking up table on one of the main table, the fixed table, and the rest table corresponding to the selected function based on the size of data to be transferred.

Figure 3:
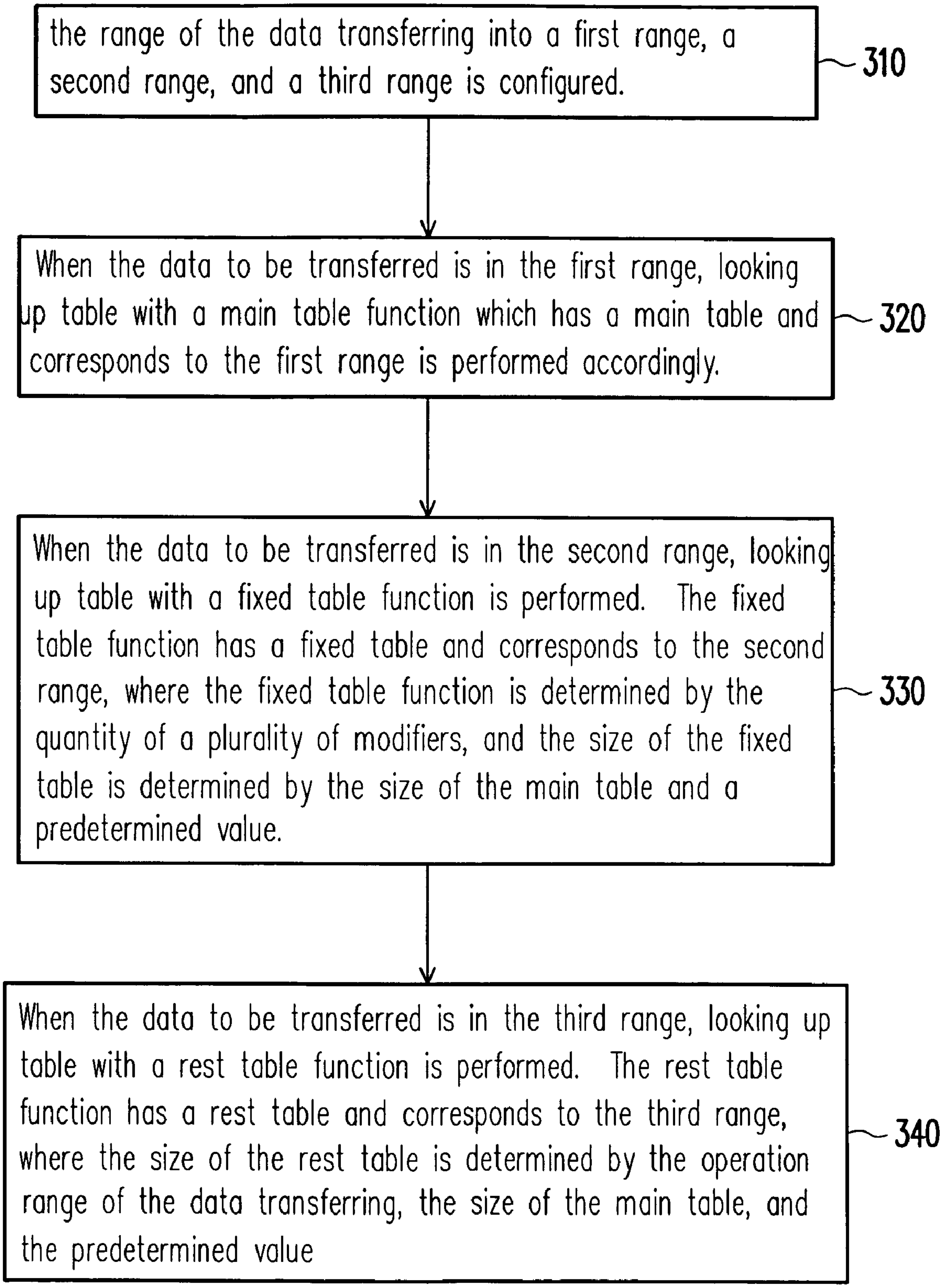

In another embodiment, as shown in FIG. 3, the present invention provides a method for looking up table for data transferring in a circuit. In the embodiment, as shown in Step 310, the range of the data transferring into a first range, a second range, and a third range is configured. When the data to be transferred is in the first range, as shown in Step 320, looking up table with a main table function which has a main table and corresponds to the first range is performed accordingly. When the data to be transferred is in the second range, , as shown in Step 330, looking up table with a fixed table function is performed. The fixed table function has a fixed table and corresponds to the second range, where the fixed table function is determined by the quantity of a plurality of modifiers, and the size of the fixed table is determined by the size of the main table and a predetermined value. When the data to be transferred is in the third range, as shown in Step 340, looking up table with a rest table function is performed. The rest table function has a rest table and corresponds to the third range, where the size of the rest table is determined by the operation range of the data transferring, the size of the main table, and the predetermined value.

Figure 4:
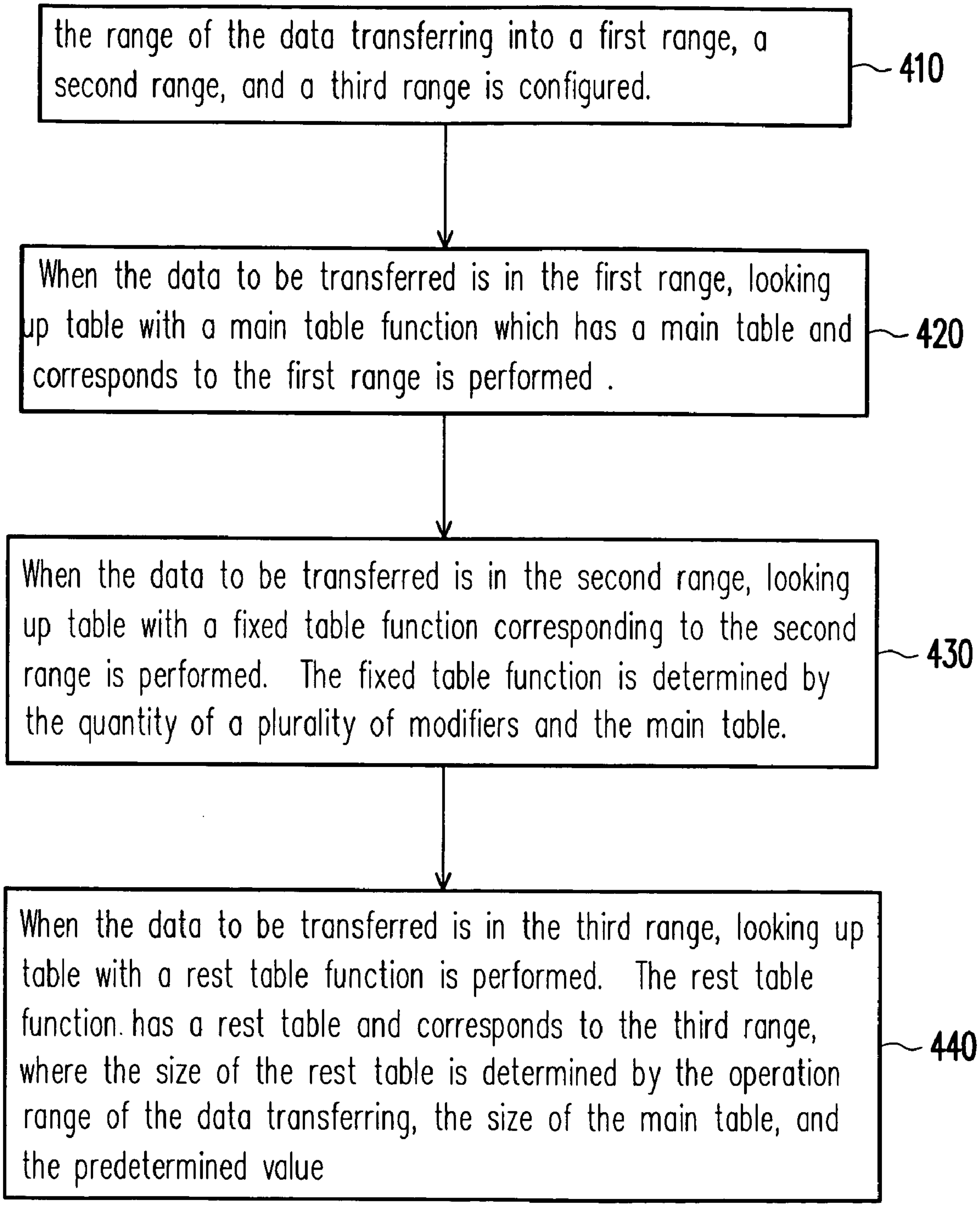
Figure 5:
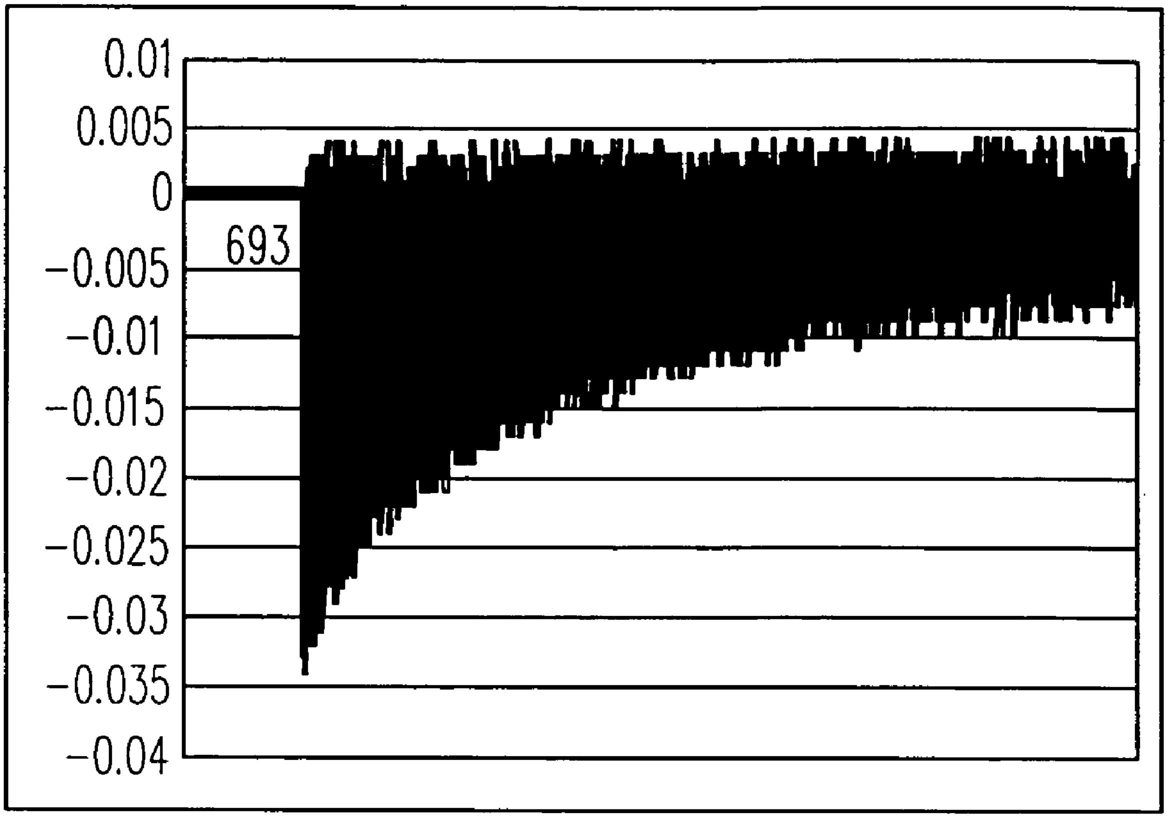
FIG. 5 schematically shows a distribution diagram of the error values obtained from a method for looking up table according to an embodiment of the present invention.

In another further embodiment, as shown in FIG. 4, the present invention provides a method for looking up table for data transferring in a circuit. In the embodiment, as shown in Step 410, the range of the data transferring into a first range, a second range, and a third range is configured. When the data to be transferred is in the first range, as shown in Step 420, looking up table with a main table function which has a main table and corresponds to the first range is performed. When the data to be transferred is in the second range, as shown in Step 430, looking up table with a fixed table function corresponding to the second range is performed. The fixed table function is determined by the quantity of a plurality of modifiers and the main table. When the data to be transferred is in the third range, as shown in Step 440, looking up table with a rest table function is performed. The rest table function has a rest table and corresponds to the third range, where the size of the rest table is determined by the operation range of the data transferring, the size of the main table, and the predetermined value. Followings are descriptions for illustrating embodiments of the invention, serve to explain the principles of the invention.

First Embodiment

Following is a first embodiment for describing the method for looking up table provided by the present invention.

It is assumed that the de-quantization algorithm to be processed is:

$$Q(x) = x^{\frac{B}{A}},$$

where $0 \leqq x < X_{max}$.

Where, x is a value to be de-quantization, Q(x) is the result of the calculation, and $X_{max}$ is the maximum value of x. The smaller the value of B/A, the higher efficiency the method for looking up table provided by the present invention. Therefore, it is recommended that B/A should be close to 1 or smaller than 1.

Pre-Processing Operation

First, following steps are performed in a pre-processing operation.

I. Performing a Division Operation

A divider is used first, and the operation performed by the divider is:

$d=2^{N \cdot A}$, where N is an integer, and $$N \leq \frac{1}{A}\log_2 X_{\max},$$

that is $d \leqq X_{max}$.

A rule is obtained from above equation, that is the bigger the value of N, the smaller the size of the look-up table. However, more modifiers are required to be added for acquiring a reasonable precision.

II. Create a Main Table Function

Then, a main table function $Tab_{main}(x)$ for the main table is created. The method for creating the main table function is described in an embodiment below.

First, the size x of the look-up table and the range corresponding to x are obtained, here the size of the main table is:

$$C_{main} = 2^{INT\left[\log_2\left(\frac{X_{\max}}{d}\right)\right]},$$

where INT(x) represents performing a process to obtain the integer for x, and x is in the range of $0 \leqq x < C_{main}$.

Then, a main table is created based on the size of the main table, such that the main table function can use it for looking up table. The content of the main table is the values corresponding to x with function $$Q(x) = x^{\frac{B}{A}},$$

where x is in the range of $0 \leqq x < C_{main}$. Here, performing the main table function $Tab_{main}(x)$ represents obtaining a value by looking up table for x.

III. Create a Fixed Table Function

A fixed table function $Tab_{fixed,M}(x)$ having a fixed table is created, where M is the quantity of the modifiers. The quantity of the modifiers may be adjusted based on various conditions for achieving the reasonable error value.

First, the size of the fixed table with respect to the $M^{th}$ modifier and the corresponding range thereof are configured. The size of the fixed table with respect to the $M^{th}$ modifier is:

$$C_{fixed,M}=[C_{main}-(C_{main}/d)]$$

The total size of all tables is $C_{all\_fixed}=M \cdot C_{fixed,M}$. Where x is in the range of $C_{main} \leqq x < C_{main} \cdot d$.

Then, the fixed table function $Tab_{fixed,M}(x)$ for the $M^{th}$ modifier is created:

(1) All modifiers are:

$$(C_{main}+d\cdot i)^{\frac{B}{A}}\cdot\left[\frac{B}{A}\frac{1}{C_{main}+d\cdot i}y+\frac{1}{2!}\frac{B}{A}\left(\frac{B}{A}-1\right)\left(\frac{1}{C_{main}+d\cdot i}\right)^2y^2+\ldots\right]=$$

$$(C_{main}+d\cdot i)^{\frac{B}{A}}\sum_{k=1}^{M}\frac{1}{k!}\left(\frac{1}{C_{main}+d\cdot i}\right)^k y^k\prod_{j=0}^{k-1}\left(\frac{B}{A}-j\right).$$

The modifiers are created based on the Binomial function, that is when $-1<x<1$ $$(1+x)^a = 1ax + \frac{1}{2!}a(a-1)x^2 + \frac{1}{3!}a(a-1)(a-2)x^3 + \ldots$$

The Binomial function is suitable for all modifiers described hereinafter.

That is the $M^{th}$ modifier is represented as:

$$\frac{1}{M!}(C_{main}+d\cdot i)^{\frac{B}{A}-M}y^M\prod_{j=0}^{M-1}\left(\frac{B}{A}-j\right),$$

It is assumed that y=x % d and $$i = INT\left[\left(\frac{x}{d}\right)-\frac{C_{main}}{d}\right].$$

The quantity of the modifiers depends on the different precision requirements.

(2) The coefficient of y in the modifier is obtained from the method for looking up table, and a fixed table function is created:

$$Tab_{fixed,M}(x) = \frac{1}{M!}(C_{main}+d\cdot i)^{\frac{B}{A}-M}\prod_{j=0}^{M-1}\left(\frac{B}{A}-j\right)$$

where $i = INT\left[\left(\frac{x}{d}\right)-\frac{C_{main}}{d}\right]$.

IV. Create a Rest Table Function

A rest table function $Tab_{rest}(x)$ having a rest table is created. First, the size x of the rest table and the range corresponding to x are obtained. The size of the rest table is $C_{rest}=X_{max}-C_{main}\cdot d$, and x is in the range of $C_{main}\cdot d \leqq x < X_{max}$.

Then, a rest table is created based on the size of the rest table, such that the rest table function $Tab_{rest}(x)$ can use it for looking up table. The content of the rest table is the values corresponding to x with the function $$Q(x) = x^{\frac{B}{A}},$$

where x is in the range of $C_{main}\cdot d \leqq x < X_{max}$.

Algorithm

After the pre-processing operation, the algorithm used in the method for looking up table in the first embodiment is described in detail hereinafter. The description is based on three conditions where x is in the range of $0 \leqq x < C_{main}$, $C_{main} \leqq x < C_{main}\cdot d$, and $C_{main}\cdot d \leqq x < X_{max}$.

I. First, when $0 \leqq x < C_{main}$, the result of $O=Tab_{main}(x)$ is obtained by looking up table with the main table function.

II. When $C_{main} \leqq x < C_{main}\cdot d$, following steps are performed:

(1) Let $x'=x/d$ (or $x'=x>>(N\cdot A)$ for the fixed point operation), and a value of $R=Tab_{main}(x')$ is obtained from looking up table with the main table function.

(2) After multiplying R by $$d^{\frac{B}{A}},$$

a rough result $$O' = d^{\frac{B}{A}} \cdot R$$

is obtained.

If the value of d is appropriately selected, such that $$\frac{B}{A}\log_2 d$$

is an integer, the fixed point operation can be used, such that the multiplication is replaced by the shift operation, and the result is represented as:

$$O' = R << \left(\frac{B}{A}\log_2 d\right).$$

(3) In order to obtain a more precise result, the modifier is further added. The modifier is obtained from the method for looking up table with the fixed table function. The $M_{th}$ modifier is represented as:

$$Tab_{fixed,M}(x)\cdot y^M = \frac{1}{M!}\left(\frac{1}{C_{main}+d\cdot i}\right)^M y^M \prod_{j=0}^{M-1}\left(\frac{B}{A}-j\right), \text{ where } y = x\%d.$$

After reorganizing all processes mentioned above, the result is obtained:

$$O = d^{\frac{B}{A}} \cdot Tab_{main}\left(\frac{x}{d}\right) + \sum_{k=1}^{M} Tab_{fixed,M}(x)\cdot(x\%d)^M,$$

or for the fixed point operation:

$$O = [Tab_{main}(x >> (N\cdot A)) << \left(\frac{B}{A}\log_2 d\right)] + \sum_{k=1}^{M} Tab_{fixed,M}(x)\cdot[x \,\&(d-1)]^M.$$

III. When $C_{main}\cdot d \leqq x < X_{max}$, the result $O=Tab_{rest}(x)$ is obtained from looking up table with the rest table function.

The total size of the look-up tables based on the methods of I, II, and III mentioned above is:

$$\begin{aligned} C_{all} &= C_{main} + C_{fixed} + C_{rest} \\ &= X_{max} + (M+1)2^{INT\left[\log_2\left(\frac{X_{max}}{d}\right)\right]} - M\left(2^{INT\left[\log_2\left(\frac{X_{max}}{d}\right)\right]} \Big/ d\right) - \\ &\quad 2^{INT\left[\log_2\left(\frac{X_{max}}{d}\right)\right]}\cdot d. \end{aligned}$$

Compared to the conventional method for looking up table, the reduced size of the look-up table is:

$$\begin{aligned} C_{reduced} &= X_{max} - C_{all} \\ &= M\left(2^{INT\left[\log_2\left(\frac{X_{max}}{d}\right)\right]} \Big/ d\right) + 2^{INT\left[\log_2\left(\frac{X_{max}}{d}\right)\right]}\cdot d - (M+1) \\ &\quad 2^{INT\left[\log_2\left(\frac{X_{max}}{d}\right)\right]}. \end{aligned}$$

Application Embodiment 1

The de-quantization process of the decoder supporting the digital music format MP3 is exemplified hereinafter for describing the method for looking up table according to an embodiment of the present invention. First, the operation to be process is:

$$Q(x) = x^{\frac{4}{3}}, \text{ where } 0 \le x < 8207.$$

Pre-Processing Operation

First, a divider is used, and the operation performed in the divider is $d=2^{N\cdot A}$, where N is an integer, and $$N \le \frac{1}{A}\log_2 X_{\max},$$

that is $d \leqq X_{max}$. Assuming d is equal to 8. In the present invention, the value of d is determined based on the real precision requirement, and not necessarily limited by the value used in the present embodiment.

Then, when $0 \leqq x < 1024$, a main table function $$Tab_{main}(x) = x^{\frac{4}{3}}$$

is created.

When $1024 \leqq x < 8192$, a fixed table function $$Tab_{fixed,1}(x) = \frac{4}{3}(1024 + 8 \cdot i)^{\frac{1}{3}}$$

is created by using a modifier. The selection of the modifier has great impact on the real precision, thus it is designed based on the real precision requirement, and not necessarily limited by the value used in the present embodiment. Of course, the higher the precision, the more complicated the circuit design is.

When $8192 \leqq x < 8207$, a rest table function $$Tab_{rest}(x) = x^{\frac{4}{3}}$$

is created.

Algorithm

When $0 \leqq x < 1024$, the result $O = Tab_{main}(x)$ is obtained from looking up table with the main table function $$Tab_{main}(x) = x^{\frac{4}{3}}.$$

When $1024 \leqq x < 8192$, the result is obtained:

$$O = 16 \cdot Tab_{main}\left(\frac{x}{8}\right) + Tab_{fixed,1}(x) \cdot (x\%8),$$

or for the fixed point operation, $$O = [Tab_{main}(x>>3)<<4] + Tab_{fixed,1}(x) \cdot (x\&7).$$

When $8192 \leqq x < 8207$, the result $O = Tab_{rest}(x)$ is obtained from looking up table with the rest table function.

In the method for looking up table in the present embodiment, the total size of all look-up tables is $C_{all} = 1935$, and the reduced size of the look-up tables is $C_{reduced} = 6272$. With such method, the size of the look-up table required for the method for looking up table is significantly reduced by the simple calculations. In addition, a reasonable error range is obtained by appropriately adjusting the modifiers in the required look-up table.

For example, if Q12 (i.e. the decimal is represented by 12 bits) precision is used in the fixed point operation, originally it requires 32828 bytes of look-up table, now it only needs 5948 bytes, so the error value is significantly reduced.

Second Embodiment

In the method for looking up table according to the first embodiment of the present invention, if there is only one modifier, the fixed table in the first embodiment is obtained from the main table, thus the size of the look-up table is further reduced. The algorithm is described below (when there is only one modifier).

I. When $0 \leqq x < C_{main}$, the result $O = Tab_{main}(x)$ is obtained from looking up table with the main table function.

II. When $C_{main} \leqq x < C_{main} \cdot d$, let $x' = x/d$ (or $x' = x >> (N \cdot A)$ for the fixed operation), and a value $R = Tab_{main}(x')$ is obtained by further looking up table with the main table function.

A rough result $$O' = d^{\frac{B}{A}} \cdot R\left(\text{or } O' = R << \left(\frac{B}{A}\log_2 d\right)\right.$$

for the fixed point operation) is obtained from multiplying R by $$d^{\frac{B}{A}},$$

or by left shifting $$\frac{B}{A}\log_2 d$$

for the fixed point operation.

A more precise result is obtained by adding the modifier, The modifier is obtained from looking up table with the main table. The modifier is represented as:

$$Tab_{fixed}(x) \cdot y = d^{\frac{B}{A}} \cdot \left[Tab_{main}\left(\frac{x}{d} + 1\right) - Tab_{main}\left(\frac{x}{d}\right)\right] \cdot y,$$

or for the fixed point operation:

$$Tab_{fixed}(x) \cdot y = \left\{\left[Tab_{main}\left(\frac{x}{d} + 1\right) - Tab_{main}\left(\frac{x}{d}\right)\right] << \left[\left(\frac{B}{A} - 1\right)\log_2 d\right]\right\} \cdot y,$$

where $y = x \% d$.

After reorganizing all processes mentioned above, the result is obtained:

$$O = d^{\frac{B}{A}} \cdot Tab_{main}\left(\frac{x}{d}\right) + d^{\frac{B}{A}-1} \cdot \left[tab_{main}\left(\frac{x}{d} + 1\right) - Tab_{main}\left(\frac{x}{d}\right)\right] \cdot (x\%d),$$

or for the fixed point operation:

$$O = [Tab_{main}(x >> (N \cdot A)) << \left(\frac{B}{A}\log_2 d\right)] + \{[Tab_{main}([x >> (N \cdot A)] + 1) - Tab_{main}([x >> (N \cdot A)] - 1)] << \left[\left(\frac{B}{A} - 1\right)\log_2 d\right]\} \cdot [x \,\&(d-1)].$$

III. When $C_{main} \cdot d \leqq x < X_{max}$, the result $O = Tab_{rest}(x)$ is obtained from looking up table with the rest table.

The total size of the required look-up tables based on the method mentioned above is:

$$C_{all} = C_{mian} + C_{rest} = 2^{INT\left[\log_2\left(\frac{X_{max}}{d}\right)\right]} + X_{max} - 2^{INT\left[\log_2\left(\frac{X_{max}}{d}\right)\right]} \cdot d.$$

Compared to the conventional method for looking up table, the reduced size of the look-up table is:

$$C_{reduced} = X_{max} - C_{all} = (d-1) \cdot 2^{INT\left[\log_2\left(\frac{X_{max}}{d}\right)\right]}.$$

Application Embodiment 2

The de-quantization process for the decoder supporting the digital music format MP3 is exemplified hereinafter for describing the method for looking up table according to the embodiment of the present invention. First, the operation to be process is:

$$Q(x) = x^{\frac{4}{3}},$$

where $0 \leqq x < 8207$.

Pre-Processing Operation

First, a divider is used, and the operation performed in the divider is $d = 2^{N \cdot A}$, where N is an integer, and $$N \leq \frac{1}{A}\log_2 X_{max},$$

that is $d \leqq X_{max}$. Assuming d is equal to 8. In the present invention, the value of d is determined based on the real precision requirement, and not necessarily limited by the value used in the present embodiment.

Then, when $0 \leqq x < 1024$, a main table function $$Tab_{main}(x) = x^{\frac{4}{3}}$$

is created.

When $8192 \leqq x < 8207$, a rest table function $$Tab_{rest}(x) = x^{\frac{4}{3}}$$

is created

Algorithm (1) When $0 \leqq x < 1024$, the result $O = Tab_{main}(x)$ is obtained from looking up table with the main table function $$Tab_{main}(x) = x^{\frac{4}{3}}.$$

When $1024 \leqq x < 8192$, the result is obtained:

$$O = 16 \cdot Tab_{main}\left(\frac{x}{8}\right) + 2 \cdot \left[Tab_{main}\left(\frac{x}{8} + 1\right) - Tab_{main}\left(\frac{x}{8}\right)\right] \cdot (x\%8),$$

or for the fixed point operation, $$O = [Tab_{main}(x >> 3) << 4] + \{[Tab_{main}(x >> 3) + 1 - Tab_{main}((x >> 3) - 1)] << 1\} \cdot (x \,\&\, 7).$$

When $8192 \leqq x < 8207$, the result $O = Tab_{rest}(x)$ is obtained from looking up table with the rest table function.

In the method for looking up table in the present embodiment, the total size of all look-up tables is $C_{all} = 1039$, and the reduced size of the look-up tables is $C_{reduced} = 7168$. With such method, the size of the look-up table required for the method for looking up table is significantly reduced by the simple calculations. In addition, a reasonable error range is obtained by appropriately adjusting the modifiers in the required look-up table.

For example, if Q12 (i.e. the decimal is represented by 12 bits) precision is used in the fixed point operation, originally it requires 32828 bytes of look-up table (each element uses 32 bytes), now it only needs 4156 bytes (each element uses 32 bytes), which is only ⅛ of the original size, so the error value is significantly reduced. In the physical application, the maximum error is 0.033, and RMS is 0.0012. In the case of the digital music format MP3, since the possibility of x>1024 is very small, and there is no error in such range, the average error for this operation is very small, which is close to 0.

Referring to FIG. 1, which schematically shows a distribution diagram of the error values obtained from a method for looking up table according to an embodiment of the present invention. As shown in the diagram, since d is configured as 8, eight errors are combined as one group, and the value is gradually increased from a small value. In addition, it is also observed from the diagram that the total error is gradually decreased.

Application Embodiment 3

The quantization process for the encoder supporting the digital music format MP3 is exemplified hereinafter for describing the method for looking up table according to the embodiment of the present invention. First, the operation to be process is:

$$Q(x) = x^{\frac{4}{3}},$$

where $0 \leqq x < 16384$.

Pre-Processing Operation

First, a divider is used, and the operation performed in the divider is $d=2^{N \cdot A}$, where N is an integer, and $$N \leq \frac{1}{A}\log_2 X_{\max},$$

that is $d \leqq X_{max}$. Assuming d is equal to 16. In the present invention, the value of d is determined based on the real precision requirement, and not necessarily limited by the value used in the present embodiment.

Then, when $0 \leqq x < 1024$, a main table function $$Tab_{main}(x) = x^{\frac{4}{3}}$$

is created.

Algorithm (1) When $0 \leqq x < 1024$, the result $O=Tab_{main}(x)$ is obtained from looking up table with the main table function $$Tab_{main}(x) = x^{\frac{4}{3}}.$$

When $1024 \leqq x < 16384$, the result is obtained:

$$O = 8 \cdot Tab_{main}\left(\frac{x}{16}\right) + \left[Tab_{main}\left(\frac{x}{16} + 1\right) - Tab_{main}\left(\frac{x}{16}\right)\right] \cdot (x\%16)/2,$$

or for the fixed point operation, $$O=[Tab_{main}(x>>4)<<3]+\{[Tab_{main}((x>>4)+1)-Tab_{main}((x>>4)-1)]>>1\}\cdot(x\&15)$$

In the method for looking up table in the present embodiment, the total size of all look-up tables is $C_{all}=1024$, and the reduced size of the look-up tables is $C_{reduced}=15360$, which is only 1/16 of the original size. With such method, the size of the look-up table required for the method for looking up table is significantly reduced by simplifying the calculations. In addition, if Q9 (i.e. the decimal is represented by 9 bits) precision is used in the fixed point operation, an error free quantization process is achieved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for data transferring in a circuit using looking up table, the method comprising:

creating, at a processor of the circuit, a main table function having a main table, wherein the size of the main table is determined by a predetermined value, and querying the main table obtains the result of the main table function;

creating, at the processor of the circuit, a fixed table function having a fixed table, wherein the fixed table function is determined by the quantity of a plurality of modifiers, and the size of the fixed table is determined by the size of the main table and the predetermined value;

creating, at the processor of the circuit, a rest table function having a rest table, wherein the size of the rest table is determined by the operation range of the data transferring, the size of the main table, and the predetermined value;

obtaining, at the processor of the circuit, the result of data transferring by selecting a function among the main table function, the fixed table function, and the rest table function, and performing a process of looking up table on one of the main table, the fixed table, and the rest table corresponding to the selected function based on the size of data to be transferred; and wherein the data transferring is:

$Q(x)=x^{B/A}$, where $0 \leqq x < X_{max}$, wherein Q(x) is the result of the data transferring, x is an input value, A and B are integers, Xmax is the maximum value of the data transferring, and the predetermined value is:

$d=2^{N \cdot A}$, where d is the predetermined value, N is an integer, and $$N \leq \frac{1}{A}\log_2 X_{\max},$$

that is $d \leqq X_{max}$.

2. The method for data transferring in a circuit using looking up table of claim 1, wherein the size of the main table is $C_{main}$, where $$C_{main} = 2^{INT\left[\log_2\left(\frac{X_{max}}{d}\right)\right]},$$

and INT(a) represents an operation of obtaining an integer for a, if the size x of the data to be transferred is in the range of $0 \leqq x < C_{main}$, the main table function $Tab_{main}(x)$ is selected to generate the result of the data transferring.

3. The method for data transferring in a circuit using looking up table of claim 2, wherein the size of the fixed table for $M^{th}$ modifier is $C_{fixed,M}=[C_{main}-(C_{main}/d)]$, the total size of all fixed table is $C_{all\_fixed}=M \cdot C_{fixed,M}$, and the size x of the data to be transferred is in the range of $C_{main} \leqq X < C_{main} \cdot d$.

4. The method for data transferring in a circuit using looking up table of claim 3, wherein the $M^{th}$ modifier is represented as:

$$\frac{1}{M!}(C_{main} + d \cdot i)^{\frac{B}{A}-M} y^M \prod_{j=0}^{M-1}\left(\frac{B}{A} - j\right),$$

where y=x % d and $$i = INT\left[\left(\frac{x}{d}\right) - \frac{C_{main}}{d}\right],$$

the quantity of the modifiers depends on different precision requirements, a coefficient of y in the modifier is obtained from looking up table, and the created fixed table function is:

$$Tab_{fixed,M}(x) = \frac{1}{M!}(C_{main} + d\cdot i)^{\frac{B}{A}-M}\prod_{j=0}^{M-1}\left(\frac{B}{A} - j\right),$$

$$\text{where } i = INT\left[\left(\frac{x}{d}\right) - \frac{C_{main}}{d}\right].$$

5. The method for data transferring in a circuit using looking up table of claim 4, wherein the size of the rest table is $C_{rest}=X_{max}-C_{main}\cdot d$, the size x of the data to be transferred is in the range of $C_{main}\cdot d \leqq x < X_{max}$, and the and the rest table is created based on the size of the rest table, such that the rest table function obtains the values corresponding to the size x of the data to be transferred in the range of $C_{main}\cdot \leqq x < X_{max}$.

6. The method for data transferring in a circuit using looking up table of claim 5, wherein the result of the data transferring is obtained by performing the main table function, the fixed table function, and the rest table function on the main table, the fixed table, and the rest table respectively based on the condition that the size x of the data to be transferred is in the range of $0 \leqq x < C_{main}$, $C_{main} \leqq x < C_{main}\cdot d$, or $C_{main}\cdot d \leqq x < X_{max}$.

7. The method for data transferring in a circuit using looking up table of claim 6, wherein when $0 \leqq x < C_{main}$, the result obtained from looking up table with the main table function is $Tab_{main}(x)$.

8. The method for data transferring in a circuit using looking up table of claim 6, wherein when $C_{main} \leqq x < C_{main}\cdot$, following steps are performed:

obtaining a value $R=Tab_{main}(x')$ from looking up table with the main table function, where x'=x/d;

obtaining a first result $$O' = d^{\frac{B}{A}}\cdot R$$

from multiplying R by $$d^{\frac{B}{A}};$$

obtaining a second result by further adding the modifier, and the precision of the second result is higher than the first result, wherein the modifier is obtained from looking up table with the fixed table function, and the $M^{th}$ modifier is presented as:

$$Tab_{fixed,M}(x)\cdot y^M = \frac{1}{M!}\left(\frac{1}{C_{main} + d\cdot i}\right)^M y^M \prod_{j=0}^{M-1}\left(\frac{B}{A} - j\right),$$

where Y =x % d, and reorganizing the steps mentioned above to obtain the second result:

$$O = d^{\frac{B}{A}}\cdot Tab_{main}\left(\frac{x}{y}\right) + \sum_{k=1}^{M} Tab_{fixed,M}(x)\cdot(x\%d)^M.$$

9. The method for data transferring in a circuit using looking up table of claim 8, wherein when $C_{main}\cdot d \leqq x < X_{max}$, the result $O=Tab_{rest}(x)$ is obtained from looking up table with the rest table function.

10. The method for data transferring in a circuit using looking up table of claim 9, wherein the total size of the look-up tables is:

$$C_{all} = C_{main} + C_{fixed} + C_{rest} = X_{max} + (M+1)2^{INT\left[\log_2\left(\frac{X_{max}}{d}\right)\right]} - M\left(2^{INT\left[\log_2\left(\frac{X_{max}}{d}\right)\right]}\Big/d\right) - 2^{INT\left[\log_2\left(\frac{X_{max}}{d}\right)\right]}\cdot d.$$

11. The method for data transferring in a circuit using looking up table of claim 6, wherein when $C_{main} \leqq x <_{main}\cdot d$, following steps are performed:

obtaining x'=x>>(N·A) by performing a fixed point operation and obtaining a value $R=Tab_{main}(x')$ from looking up table with the main table function;

setting the value of d, such that $$\frac{B}{A}\log_2 d$$

is an integer, and performing a shift operation to obtain a first result $$O' = R << \left(\frac{B}{A}\log_2 d\right);$$

summating the first result and the modifier to obtain a second result, wherein the precision of the second result is higher than the first result, the modifier is obtained from looking up table with the fixed table function, and the $M^{th}$ modifier is presented as:

$$Tab_{fixed,M}(x)\cdot y^M = \frac{1}{M!}\left(\frac{1}{C_{main} + d\cdot i}\right)^M y^M \prod_{j=0}^{M-1}\left(\frac{B}{A} - j\right),$$

where $y = x\,\%\,d$, and reorganizing the steps mentioned above to obtain the second result:

$$O = [Tab_{main}(x >> (N \cdot A)) << \left(\frac{B}{A}\log_2 d\right)] + \sum_{k=1}^{M} Tab_{fixed,M}(x) \cdot [x \,\&(d-1)]^M.$$

12. A method for data transferring using looking up table in a circuit, the method comprising:

creating, at a processor of the circuit, a main table function having a main table, wherein the size of the main table is determined by a predetermined value, and querying the main table obtains the result of the main table function;

creating, at the processor of the circuit, a fixed table function, wherein the fixed table function is determined by the quantity of a plurality of modifiers and the main table, and the size of the fixed table is determined by the size of the main table and the predetermined value;

creating, at the processor of the circuit, a rest table function having a rest table, wherein the size of the rest table is determined by the operation range of the data transferring, the size of the main table, and the predetermined value;

obtaining, at the processor of the circuit, the result of data transferring by selecting a function from one of the main table function, the fixed table function, and the rest table function, and performing a process of looking up table on one of the main table, the fixed table, and the rest table corresponding to the selected function based on the size of data to be transferred; and wherein the data transferring is:

$$Q(x) = x^{\frac{B}{A}},$$

where $$0 \le x < X_{\max},$$

wherein Q(x) is the result of the data transferring, x is an input value, A and B are integers, $X_{max}$ is the maximum value of the data transferring, and the predetermined value is:

$d=2^{N \cdot A}$, where d is the predetermined value, N is an integer, and $$N \le \frac{1}{A}\log_2 X_{\max},$$

that is $d \leqq X_{max}$.

13. The method for data transferring using in a circuit looking up table of claim 12, wherein the size of the main table is $$C_{main},$$

where $$C_{main} = 2^{INT\left[\log_2\left(\frac{X_{\max}}{d}\right)\right]},$$

and INT(a) represents an operation of obtaining an integer for a, if the size x of the data to be transferred is in the range of $0 \leqq x < C_{main}$, the main table function $Tab_{main}(x)$ is selected to generate the result of the data transfer.

14. The method for data transferring using in a circuit looking up table of claim 13, wherein when the size x of the data to be transferred is in the range of $C_{main} x \leqq C_{main} \cdot d$, let $x' = x/d$, such that a value of $R = Tab_{main}(x')$ is obtained from looking up table with the main table function, and a first result $$O' = d^{\frac{B}{A}} \cdot R$$

of the data transferring is obtained by multiplying R by $d^{B/A}$.

15. The method for data transferring using in a circuit looking up table of claim 14, wherein a second result is obtained by summating the first result and the modifier, the precision of the second result is higher than the first result, and the modifier is obtained from looking up table on the main table.

16. The method for data transferring using in a circuit looking up table of claim 15, wherein the modifier is represented as:

$$Tab_{fixed}(x) \cdot y = d^{\frac{B}{A}-1} \cdot \left[Tab_{main}\left(\frac{x}{d}+1\right) - Tab_{main}\left(\frac{x}{d}\right)\right] \cdot y,$$

where Y=x % d, thus the second result of the data transferring is:

$$O = d^{\frac{B}{A}} \cdot Tab_{main}\left(\frac{x}{d}\right) + d^{\frac{B}{A}-1} \cdot \left[Tab_{main}\left(\frac{x}{d}+1\right) - Tab_{main}\left(\frac{x}{d}\right)\right] \cdot (x \,\%\, d).$$

17. The method for data transferring using in a circuit looking up table of claim 16, wherein the size of the rest table is $C_{rest} = X_{max} - C_{main} \cdot d$, the size x of the data to be transferred is in the range of $C_{main} \cdot d \leqq x < X_{max}$, and the and the rest table is created based on the size of the rest table, such that the rest table function obtains the values corresponding to the size x of the data to be transferred in the range of $C_{main} \cdot d \leqq x < X_{max}$.

18. A method for data transferring using looking up table in a circuit, the method comprising:

configuring, at a processor of the circuit, the range of the data transferring into a first range, a second range, and a third range; and when the data to be transferred is in the first range, performing looking up table at the processor of the circuit with a main table function which has a main table and corresponds to the first range;

when the data to be transferred is in the second range, performing looking up table at the processor of the circuit with a fixed table function which has a fixed table and corresponds to the second range; wherein the fixed table function is determined by the quantity of a plurality of modifiers, and the size of the fixed table is determined by the size of the main table and a predetermined value;

when the data to be transferred is in the third range, performing looking up table at the processor of the circuit with a rest table function which has a rest table and corresponds to the third range, wherein the size of the rest table is determined by the operation range of the data transferring, the size of the main table, and the predetermined value; and wherein the data transferring is:

$Q(x)=x^{B/A}$, wherein $Q \leqq x < X_{max}$, Q(x) is the result of the data transferring, x is an input value, A and B are integers, $X_{max}$ is the maximum value of the data transferring, and the predetermined value is:

$d=2^{N \cdot A}$, where d is the predetermined value, N is an integer, and $$N \leq \frac{1}{A}\log_2 X_{\max},$$

that is $d \leqq X_{max}$.

19. A method for looking up table for data transferring in a circuit using looking up table, the method comprising:

configuring, at a processor of the circuit, the range of the data transferring into a first range, a second range, and a third range;

when the data to be transferred is in the first range, performing looking up table at the processor of the circuit with a main table function which has a main table and corresponds to the first range;

when the data to be transferred is in the second range, performing looking up table at the processor of the circuit with a fixed table function corresponding to the second range, wherein the fixed table function is determined by the quantity of a plurality of modifiers and the main table;

when the data to be transferred is in the third range, performing looking up table at the processor of the circuit with a rest table function which has a rest table and corresponds to the third range, wherein the size of the rest table is determined by the operation range of the data transferring, the size of the main table, and the predetermined value; and wherein the data transferring is:

$Q(x)=x^{B/A}$, where $0 \leqq x < X_{max}$, wherein Q(x) is the result of the data transferring, x is an input value, A and B are integers, $X_{max}$ is the maximum value of the data transferring, and the predetermined value is:

$d=2^{N \cdot A}$, where d is the predetermined value, N is an integer, and $$N \leq \frac{1}{A}\log_2 X_{\max},$$

that is $d \leqq X_{max}$.

* * * * *